US008994688B2

(12) United States Patent
Selker (10) Patent No.: US 8,994,688 B2
(45) Date of Patent: Mar. 31, 2015

(54) FLAT PANEL DISPLAY WITH INTEGRAL TOUCH SCREEN (71) Applicant: Edwin Joseph Selker, Palo Alto, CA (US)

(72) Inventor: Edwin Joseph Selker, Palo Alto, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 115 days.

(21) Appl. No.: 13/742,644

(22) Filed: Jan. 16, 2013

(65) Prior Publication Data
US 2013/0127780 A1 May 23, 2013

Related U.S. Application Data (63) Continuation of application No. 12/265,414, filed on Nov. 5, 2008, now Pat. No. 8,373,667.

(51) Int. Cl.
G06F 3/045 (2006.01)
G02F 1/1335 (2006.01)
G06F 3/044 (2006.01)
G06F 3/041 (2006.01)
G09G 5/00 (2006.01)
G02F 1/1333 (2006.01)

(52) U.S. Cl.
CPC ............. *G06F 3/044* (2013.01); *G06F 3/0412* (2013.01); *G09G 5/003* (2013.01); *G02F 1/13338* (2013.01)
USPC ............................................ 345/174; 349/12

(58) Field of Classification Search
USPC ......................................................... 345/174
See application file for complete search history.

(56) References Cited

U.S. PATENT DOCUMENTS

| 4,290,061 | A | | 9/1981 | Serrano | |
|---|---|---|---|---|---|
| 5,194,852 | A | * | 3/1993 | More et al. | ..................... 345/182 |
| 6,191,828 | B1 | * | 2/2001 | Kim et al. | ........................ 349/12 |
| 6,204,897 | B1 | * | 3/2001 | Colgan et al. | ................... 349/12 |
| 7,280,167 | B2 | | 10/2007 | Choi | |
| 7,304,707 | B2 | | 12/2007 | Son | |
| 7,327,429 | B2 | | 2/2008 | Kim | |
| 2005/0052435 | A1 | | 3/2005 | Cho et al. | |
| 2005/0117103 | A1 | * | 6/2005 | Son | .............................. 349/141 |
| 2008/0018613 | A1 | | 1/2008 | Kim et al. | |

* cited by examiner

Primary Examiner — Charles V Hicks
(74) Attorney, Agent, or Firm — SoCal IP Law Group LLP; John E. Gunther; Steven C. Sereboff (57) ABSTRACT There are disclosed display devices with integral touch screens and methods for operating display panels. A display panel may include a plurality of pixels, each pixel controlled by a corresponding one of a plurality of column electrodes and a corresponding one of a plurality of row electrodes. Each column electrode may be coupled to a respective column driver circuit and at least some of the column electrodes may be coupled to respective column sensing circuits adapted to sense capacitive coupling between the respective column electrodes and a probe adjacent to an external surface of the display panel. Each row electrode may be coupled to a respective row driver circuit and at least some of the row electrodes may be coupled to respective row sensing circuits adapted to sense capacitive coupling between the respective row electrodes and a probe adjacent to an external surface of the display panel.

18 Claims, 10 Drawing Sheets

© 2013 MIT

FIG. 10

FLAT PANEL DISPLAY WITH INTEGRAL TOUCH SCREEN

RELATED APPLICATION INFORMATION

This patent claims priority from the following prior-filed copending non-provisional patent applications: patent application Ser. No. 12/265,414, entitled Flat Panel Display with Capacitance Touch Screen, filed Nov. 5, 2008.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to liquid crystal displays and other flat-panel matrix displays having an integral touch screen feature.

2. Description of the Related Art

Liquid crystal displays and other flat-panel matrix displays are widely used as flat panel televisions and as displays for desk-top and laptop computers. In some applications, a liquid crystal display panel and a touch screen sensor may be integrated to provide an apparatus that serves both as a display and an input device.

A typical touch screen sensor consists of two thin substrates separated by a small air gap. A transparent conductive film is deposited on one of the facing surfaces and a transparent resistive film is deposited on the second facing surface. The pressure of a finger or other object causes the two facing surfaces to touch. The location of the touch is determined by measuring the resistance, voltage, or current flow through several electrodes connected to the perimeter of the conductive film. Other touch screen sensors may use optical or acoustic technique to sense the touch location.

Touch screen sensors are usually separate devices that are attached to the front of the liquid crystal display panel. Separate touch screen sensors increase the cost and weight of the display unit. Additionally, touch screen sensors may degrade the clarity and contrast of the display panel.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
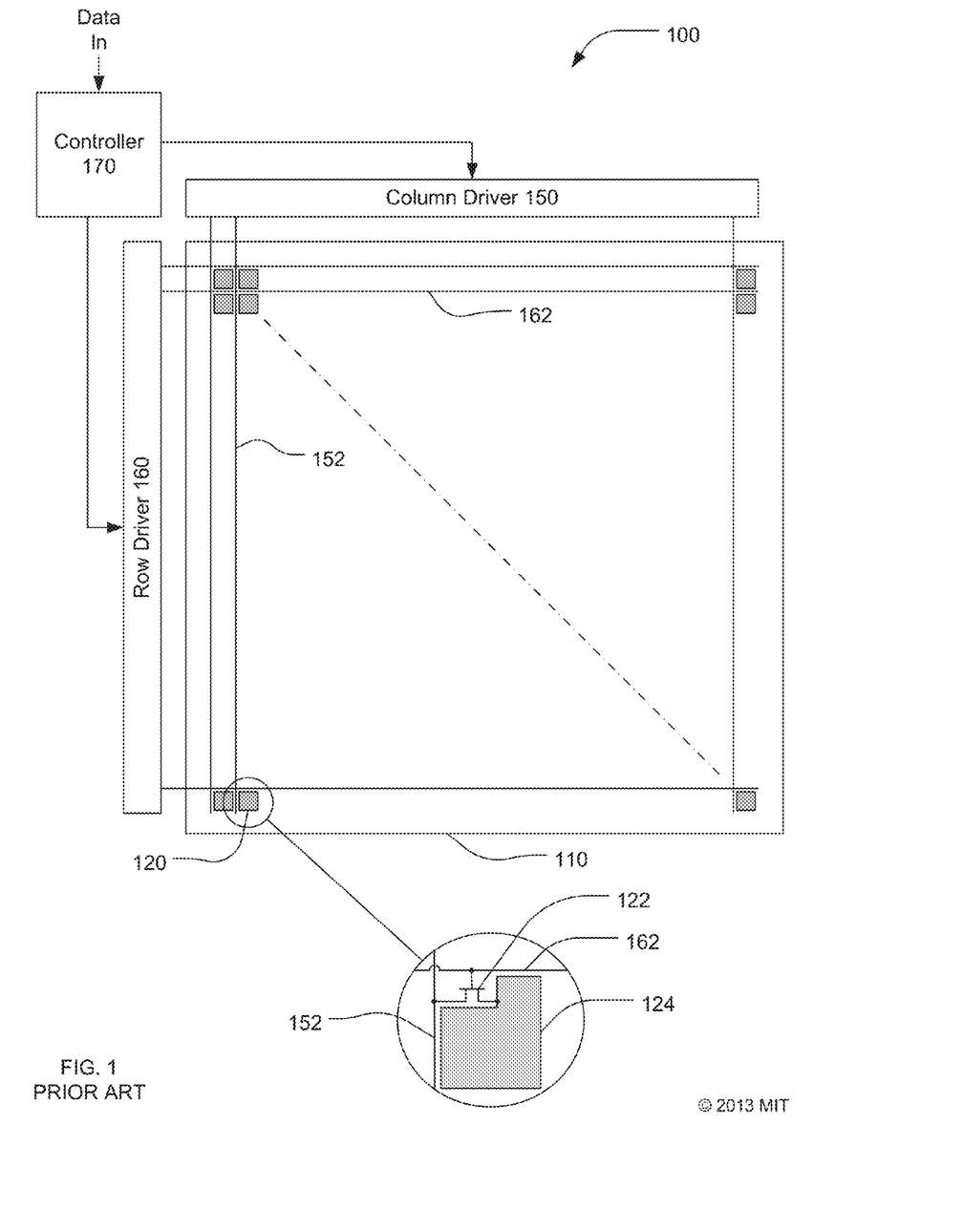
FIG. 1 is a block diagram of a convention liquid crystal display.

Referring now to FIG. 1, a conventional liquid crystal display 100 may include a liquid crystal panel 110, a column driver 150, a row driver 160, and a controller 170. The liquid crystal panel may include a rectangular array of picture element circuits, or pixels, 120. The pixels 120 may be disposed in rows and columns. Each column of pixels may be coupled to a corresponding column electrode, such as column electrode 152. Each row of pixels may be coupled to a corresponding row electrode, such as row electrode 162.

Liquid crystal display panels are available in a wide range of sizes and resolutions. For example, a representative liquid crystal display intended for use as a computer monitor may have 1050 rows with 1680 color picture elements per row. Since each color picture element may be made of adjacent red, green, and blue pixels, the display may have 1050 rows by 5040 columns of pixels. The liquid crystal display screen size, measured on the diagonal, may be 20.1 inches. In this case, the center-to-center spacing or pitch of the pixels may be 0.089 mm (0.0035 inch) between columns and 0.236 mm (0.0093 inch) between rows. Other liquid crystal displays may have resolutions of 480×640, 600×800, 768×1024, 1200×1920, and, in the future, 1600×2560 color picture elements.

Each pixel 120 commonly includes a single thin-film transistor (TFT) 122. The gate of TFT 122 may be connected to the corresponding row electrode 162. The drain of TFT 122 may be connected to the corresponding column electrode 152. The source of TFT 122 may be connected to a pixel electrode 124. Each pixel circuit may include additional components, such as another transistor or a capacitor, not shown in FIG. 1.

The controller 170 may receive input data in the form of one or more digital or analog video signals. The video signals may be, for example, compatible with the industry-standard Digital Video Interface (DVI) specification, the High Definition Multimedia Interface (HDMI) specification, or some other standard. The controller 170 may generate and provide timing, synchronization, and data signals to the column driver 150 and the row driver 160. The column driver 150 and the row driver 160 may then provide a plurality of signals to drive the corresponding columns and rows of the liquid crystal panel 110 to produce an image on the liquid crystal panel in accordance with the video input signals. The column driver 150 and row driver 160 may, in some cases, be implemented as TFT circuits integrated into the liquid crystal panel 110. More commonly, the column driver 150 and row driver 160 are each implemented in one or more integrated circuits. The integrated circuits may be mounted on or adjacent to the liquid crystal panel 110 and may be connected to the row and column electrodes using wire bonds or other interconnection technique. The row and columns signals required to produce an image on a typical liquid crystal display panel are well understood and column driver, row driver, and controller integrated circuits are commercially available.

Figure 2:
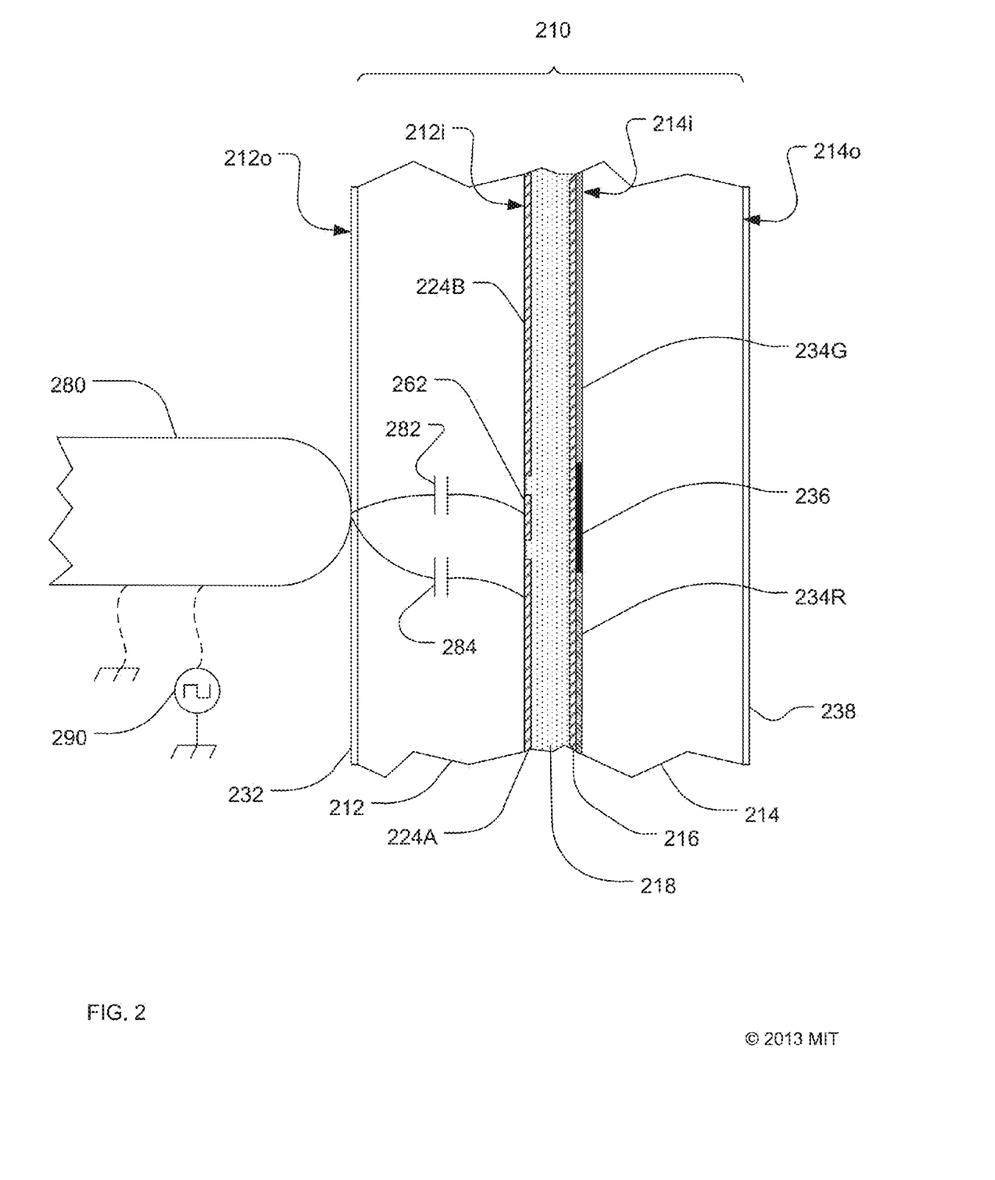
FIG. 2 is a cross-sectional schematic view of a liquid crystal display panel.

Referring now to the schematic cross-sectional view of FIG. 2, a simplified liquid crystal display panel 210 may include a transparent front plate 212 and a transparent back plate 214. The front plate 212 and the back plate 214 may be parallel and separated by a thin space filled with liquid crystal material 218. The back plate and the front plate may glass, plastic, or another transparent material. Each of the front plate 212 and the back plate 214 may have an inner surface 212$i$, 214$i$ facing the liquid crystal material 218 and an outer surface 212$o$, 214$o$ facing away from the liquid crystal material 218.

The inner surface 212$i$ of the front plate 212 may support row electrodes such as row electrode 262, the column electrodes (not shown), pixel electrodes 224A, 224B, and pixel circuits (not shown). The outer surface 212$o$ of the front plate 212, facing a viewer (not shown), may support a first linear polarizing film 232. Other optical films, such as a birefringence compensating film (not shown), may be disposed between the first linear polarizing film 232 and the front plate 212.

The inner surface 214$i$ of the back plate 214 may support a transparent counter electrode 216. A color filter array may be disposed between the back plate 214 and the counter electrode 216. The color filter array may include red, blue, and green color filter patches, such as red filter patch 234R and green filter patch 234G aligned with the pixel electrodes 224A, 224B, respectively, on the front plate. The color filter patches may be separated by, or overlaid by, opaque black regions that prevent light from passing through areas of the liquid crystal panel (such as the region 236 opposed to the row electrode 262) that do not actually present a portion of an image. The outer surface 214$o$ of the back plate 214, commonly facing a light source (not shown), may support a second linear polarizing film 238. Other optical films, such as a birefringence compensating film (not shown), may be disposed between the second linear polarizing film 238 and the back plate 214.

The schematic cross-sectional view of FIG. 2 is not drawn to scale. For reference, the thickness of the transparent electrodes 216, 224A, 224B, 262 may be about 0.5 microns (~20 microinches). The thickness of the liquid crystal layer 218 may be about 5 microns (~200 microinches). The thickness of the polarizing films 232, 238 may be about 0.2 mm (0.008 inch). The thickness of the front plate 212 and the back plate 214, depending on the size of the liquid crystal panel, may be about 0.5 mm-1.1 mm (0.02 inch to 0.043 inch). Thus, if drawn to scale, the front and back plates 212, 214 would be 100 to 200 times the thickness of the liquid crystal layer 218.

A probe 280 touching the surface of the liquid crystal panel 210 may be capacitively coupled to the electrodes within the liquid crystal panels, such as the pixel electrode 224A and the row electrode 262. The capacitive coupling to the pixel electrode 262 and to the row electrode 224A are indicated by the capacitors 282 and 284, respectively. The probe 280 may be the finger of an operator or viewer, a stylus, or some other object. Since the contact area between the probe 280 and the liquid crystal device 210 may be several millimeters in diameter, the probe 280 touching the surface of the liquid crystal display panel may be capacitively coupled to a plurality of row electrodes, column electrodes, and pixel electrodes. For example, a finger having a 3 millimeter diameter contact area with the previously described 20.1-inch liquid crystal panel may be capacitively coupled to about 12 row electrodes (3 mm/0.236 mm≈12), about 33 column electrodes (3 mm/0.089 mm≈33), and about 300 pixel electrodes (12×33×π/4≈311).

The probe 280 may be effectively grounded. In this case, the presence and position of the probe 280 may be detected by sensing the increase in the total capacitance of the row electrodes, column electrodes, and/or pixel electrodes due to capacitive coupling to the probe (represented by capacitor 282, 284). The probe 280 may be biased with an AC voltage from a source 290. In this case, the presence and position of the probe 280 may be detected by sensing the AC current or AC voltage coupled to the row electrodes, column electrodes, and/or pixel electrodes through capacitors 282, 284.

The AC voltage applied to bias the probe 280 may be, for example, a radio frequency (RF) signal having a frequency higher than the frequencies of the signals applied to the plurality of row and column electrodes to produce an image on the liquid crystal panel 210. In this case, the row electrodes, column electrodes, and/or pixel electrodes of the liquid crystal panel may effectively function as an array of antennas to receive RF energy radiated from the probe 280. The RF energy received by each of the row electrodes, column electrodes, and/or pixel electrodes may depend on the distance between the electrode and the probe 280. Thus the position of the probe may be determined from the relative amplitudes of the AC or RF signal coupled from the probe 280 to the electrodes of the liquid crystal panel 210. Within this application, the term "capacitively coupled" is intended to encompass the coupling of a static charge and/or the coupling of an AC or RF signal from the probe 280 to the electrodes of the liquid crystal panel 210 through the dielectric front plate 212.

Figure 3:
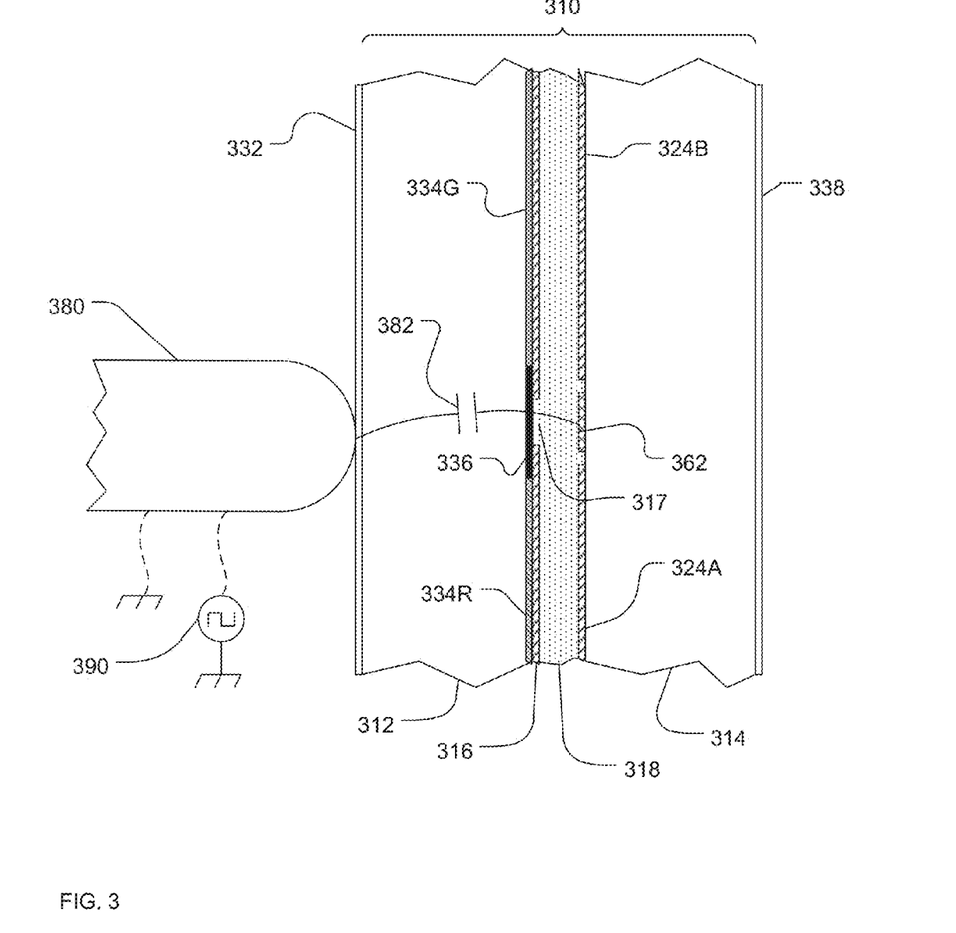
FIG. 3 is a cross-sectional schematic view of a liquid crystal display panel.

Referring to the schematic cross-sectional view of FIG. 3, a liquid crystal display panel 310 may include a transparent front plate 312 and a transparent back plate 314, separated by a thin space filled with liquid crystal material 318. The liquid crystal display panel 310 has a somewhat different configuration than the liquid crystal display panel 210.

The inner surface of the front plate 312 facing the liquid crystal material 318 may support a transparent counter electrode 316. A color filter array may be disposed between the front plate 312 and the counter electrode 316. The color filter array may include red, blue, and green color filter patches, such as red filter patch 334R and green filter patch 334G. The color filter patches may be separated by, or overlaid by, opaque black regions that prevent light from passing through areas of the liquid crystal panel (such as the region 336 opposed to the row electrode 362) that do not actually present a portion of an image. The outer surface of the front plate 312, commonly facing a viewer (not shown), may support a first linear polarizing film 332. Other optical films, such as a birefringence compensating film (not shown), may be disposed between the first linear polarizing film 332 and the front plate 312.

The inner surface of the back plate 314, facing the liquid crystal material 318, may support row electrodes such as row electrode 362, the column electrodes (not shown), pixel electrodes 324A, 324B, and pixel circuits (not shown). The outer surface of the back plate 314, commonly facing a light source (not shown), may support a second linear polarizing film 338. Other optical films, such as a birefringence compensating film (not shown), may be disposed between the second linear polarizing film 338 and the back plate 314.

A probe 380 touching the surface of the liquid crystal panel 310 may be capacitively coupled primarily to the counter electrode 316. When the counter electrode 316 is a continuous conductive sheet, the probe 380 may not be coupled to the row electrodes, column, electrodes, or pixel electrode on the back plate 314. In this case, it may not be possible to detect the location of the probe 380. In order to detect the location of the probe 380, the probe must be capacitively coupled to at least the row and column electrodes on the back plate 314. This may be accomplished by forming openings, such as opening 317 in the counter electrode 316 opposed to the row electrodes, such as the row electrode 362, and the column electrodes (not shown). The opening 317 may allow capacitive coupling between the probe 380 and the row electrode 362, as indicated by the capacitor 382.

Figure 4:
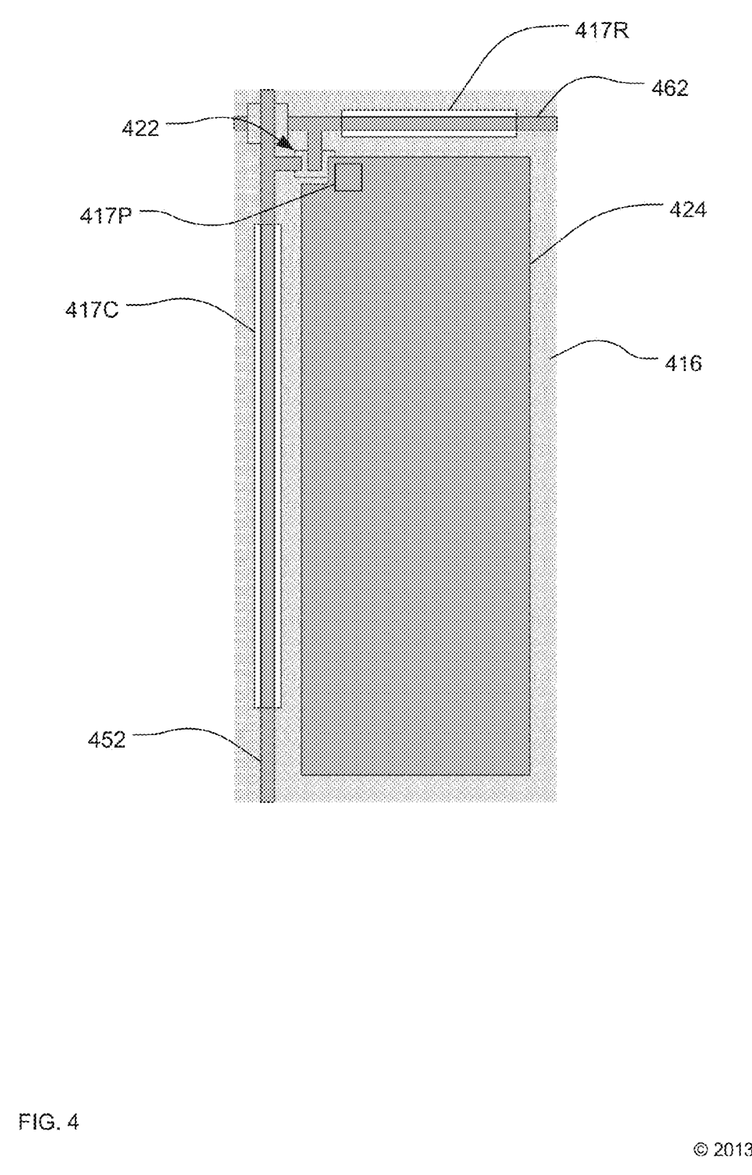
FIG. 4 is a schematic view of a liquid crystal display panel through the counter electrode.

FIG. 4 is a schematic view of a single pixel of a liquid crystal display panel, which may be the display panel 300, as seen by a viewer through a transparent counter electrode 416. Each pixel circuit may include a row electrode 462, a column electrode 452, a pixel electrode 424, and a transistor 422. The transistor 422 may be a TFT having a gate, a source and a drain. The gate of the transistor 422 may be connected to the row electrode 462. The drain of the transistor 422 may be connected to the column electrode 452, and the source of the transistor 422 may be connected to the pixel electrode 424. The transparent counter electrode 416 may be interposed between the viewer and the row electrode 462, the column electrode 452, and the pixel electrode 424.

When a continuous unbroken transparent counter electrode 416 is interposed between the viewer and the pixel circuits, a probe such as the probe 380 in FIG. 3 may not capacitively couple to the row electrode 462, the column electrode 452, or the pixel electrode 424. Openings 417R, 417C may be provided in the transparent counter electrode 416 to allow capacitive coupling between a probe and the row and column electrodes 452, 462, respectively. Alternatively, openings 417P may be provided in the transparent counter electrode 416 to allow capacitive coupling between a probe and some or all of the pixel electrodes 424. Since the liquid crystal material adjacent to the opening 417P may not function to form an image, the opening 418P may be covered by an opaque black material, such as material 336 in FIG. 3.

Figure 5:
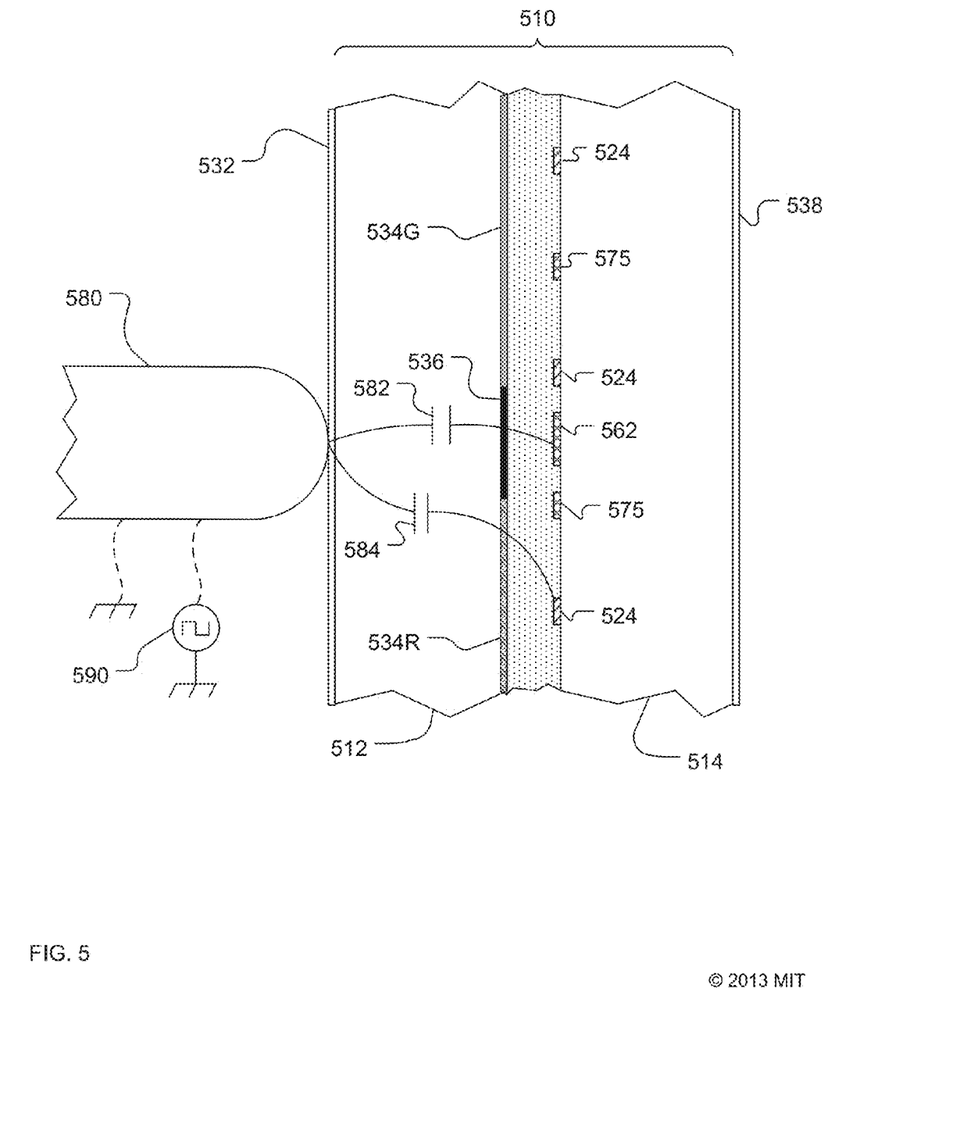
FIG. 5 is a cross-sectional schematic view of a liquid crystal display panel.

Referring now to the schematic cross-sectional view of FIG. 5, a liquid crystal display panel 510 may include a transparent front plate 512 and a transparent back plate 514 separated by a thin space filled with liquid crystal material 518. The liquid crystal display panel 510 may incorporate a liquid crystal driving technique commonly termed "in-plane switching", wherein all of the electrodes for forming an image in the liquid crystal layer are disposed on one of the front and back plates.

The inner surface of the front plate 512 facing the liquid crystal material 518 may support a color filter array. The color filter array may include red, blue, and green color filter patches, such as red filter patch 534R and green filter patch 534G. The color filter patches may be separated by, or overlaid by, opaque black regions that prevent light from passing through areas of the liquid crystal panel (such as the region 536 opposed to the row electrode 562) that do not actually present a portion of an image. The outer surface of the front plate 512, commonly facing a viewer (not shown), may support a first linear polarizing film 532. Other optical films, such as a birefringence compensating film (not shown), may be disposed between the first linear polarizing film 532 and the front plate 512.

The inner surface of the back plate 514, facing the liquid crystal material 518, may support row electrodes such as row electrode 562, the column electrodes (not shown), pixel electrodes 524, ground electrodes 575, and pixel circuits (not shown). The pixel electrodes 524 and the ground electrodes 575 may be interleaved such that a voltage applied between a pixel electrode 525 and the interleaved ground electrode may form an electric field essentially parallel to the surface of the back plate 514. The outer surface of the back plate 514, commonly facing a light source (not shown), may support a second linear polarizing film 538. Other optical films, such as a birefringence compensating film (not shown), may be disposed between the second linear polarizing film 538 and the back plate 514.

A probe 580 touching the surface of the liquid crystal panel 510 may be capacitively coupled to the column electrodes (not shown), the row electrodes such as row electrode 562, the pixel electrodes 524, and the ground electrodes 575. The capacitive coupling is exemplified by the capacitors 582 and 584.

Figure 6:
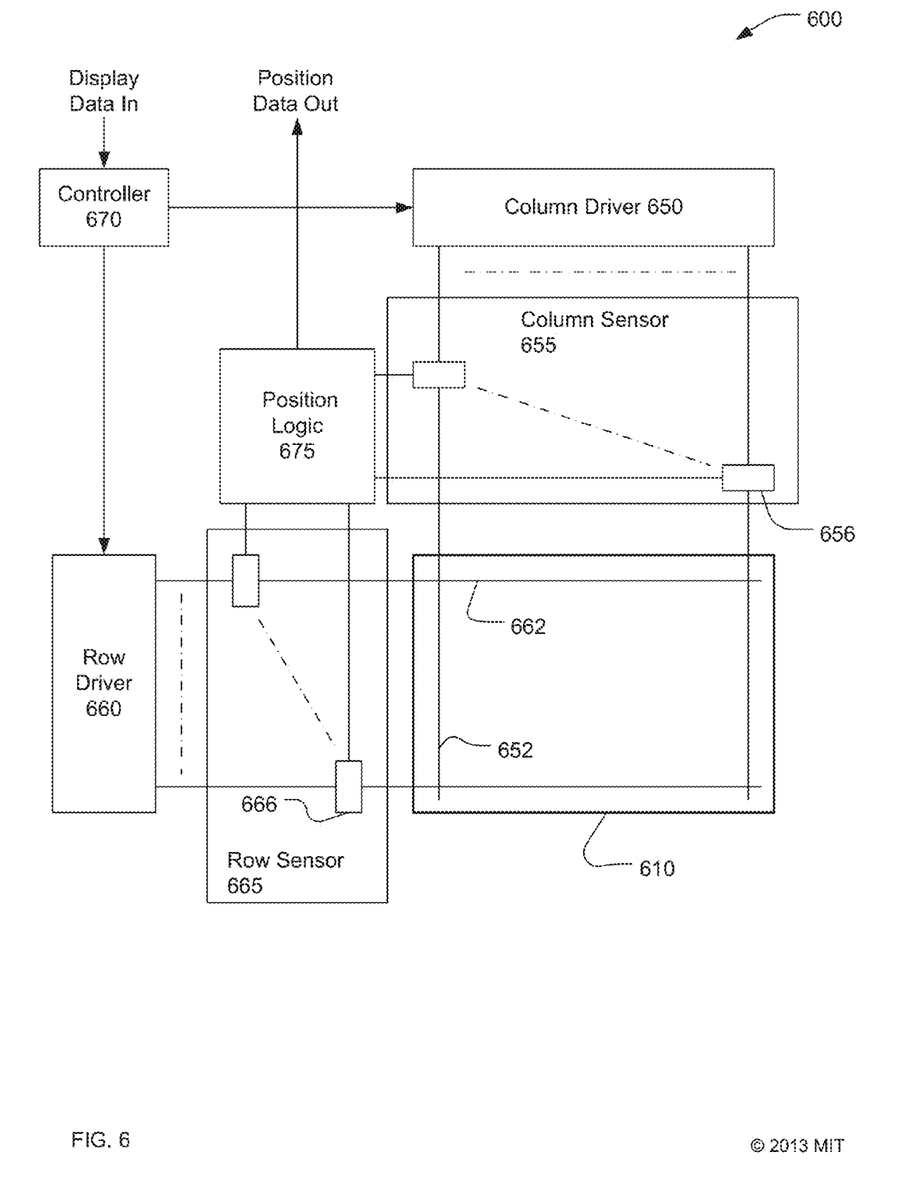
FIG. 6 is a block diagram of a liquid crystal display with an integral touch-screen sensor.

Referring now to FIG. 6, a flat panel display 600 may include a display panel 610, a column driver 650, a row driver 660, and a controller 670. The display panel 610 may include a rectangular array of picture element circuits (not shown) disposed in rows and columns. The display panel 610 may be a liquid crystal display panel, an organic LED panel, a plasma display panel, or other display panel having a matrix of picture elements. Each column of pixels may be coupled to a corresponding column electrode, such as column electrode 652. Each row of pixels may be coupled to a corresponding row electrode, such as row electrode 662. The display panel 610, the column driver 650, the row driver 660, and the controller 670 may function as described for the corresponding elements of FIG. 1.

The flat panel display 600 may also include a column sensor 655 and/or a row sensor 665. The column sensor 655 may be adapted to sense and locate capacitive coupling between a probe and the column electrodes within the display panel 610. The row sensor 665 may be adapted to sense and locate capacitive coupling between a probe and the row electrodes within the display panel 610. The column sensor 655 may be adapted to sense and locate capacitive coupling between a probe and pixel electrodes within the display panel 610, in which case the row sensor 665 is not required.

The column sensor 655 may include a plurality of column sensing circuits 656 connected to at least some of the column electrodes. The column sensor 655 may include one column sensing circuit 656 per column electrode. The number of column sensor circuits 656 may be smaller than the number of column electrodes. For example, there may be a column sensing circuit connected to every third column electrode. The number of column sensing circuits 656 may be selected to provide the desired positional accuracy when detecting a probe coupled to the display panel 610. Each column sensing circuit 656 may be adapted to sense a current flow in the corresponding column electrode caused by capacitive coupling to a probe. Each column sensing circuit 656 may be adapted to sense a voltage on the corresponding column electrode introduced by capacitive coupling to a probe.

The row sensor 665 may include a plurality of row sensing circuits 666 connected to the row electrodes. The row sensor 665 may include one row sensing circuit 666 per row electrode. The number of row sensor circuits 666 may be smaller than the number of row electrodes. For example, there may be a row sensing circuit connected to every other row electrode. The number of row sensing circuits 666 may be selected to provide the desired positional accuracy when detecting a probe coupled to the display panel 610. Each row sensing circuit 666 may be adapted to sense a current flow in the corresponding row electrode caused by capacitive coupling to a probe. Each row sensing circuit 666 may be adapted to sense a voltage on the corresponding row electrode introduced by capacitive coupling to a probe.

The column driver 650 and the column sensor 655 may be integrated within one or more integrated circuits chips. For example, the 5040 column electrodes of the previously described exemplary display may be connected to 16 integrated circuit chips. Each of the 16 integrated circuit chips may connect to 315 column electrodes. Each of the 16 integrated circuit chips may contain a portion of the column driver 650 and a corresponding portion of the column sensor 655. Each integrated circuit chip may be fabricated using a technology, such as CMOS, suitable for both the column driver and column sensor circuits.

Similarly, the row driver 660 and the row sensor 665 may be integrated within one or more integrated circuits chips. For example, the 1050 column electrodes of the previously described exemplary display may be connected to 5 integrated circuit chips. Each of the 5 integrated circuit chips may connect to 210 row electrodes. Each of the 5 integrated circuit chips may contain a portion of the row driver 660 and a corresponding portion of the row sensor 665. Each integrated circuit chip may be fabricated using a technology, such as CMOS, suitable for both the row driver and row sensor circuits.

The use of 16 integrated circuit chips connected to the column electrodes and 5 integrated circuit chips connected to the row electrodes is an example. Fewer or more integrated circuit chips may be used.

The flat panel display 600 may also include position logic 675 coupled to the column sensor 655 and to the row sensor 665. The position logic may determine the centroid of a probe, such as a finger, sensed by multiple adjacent column position sensors. The position logic may include a tracker to estimate the position of a moving probe coupled to the display panel 610. The position logic may be capable of detecting and tracking multiple probes coupled to the display panel 610. The position logic may differentiate multiple probes coupled to the display panel 610 based on, for example, the relative size of the contact area between each probe and the display panel 610 and/or the relative motion of each probe. The position logic may provide position data, for example in the form of x-y coordinates, for one or more probes coupled to the display panel 610. The position data may be provided to a computer or other device external to the flat panel display 600, for example via a parallel or serial bus.

All or a portion of the position logic may be located in a device external to the flat panel display 600. The outputs from the plurality of row position sensors 656 and/or the plurality of column position sensors 666 may be provided to the external device, for example via a serial bus.

Figure 7:
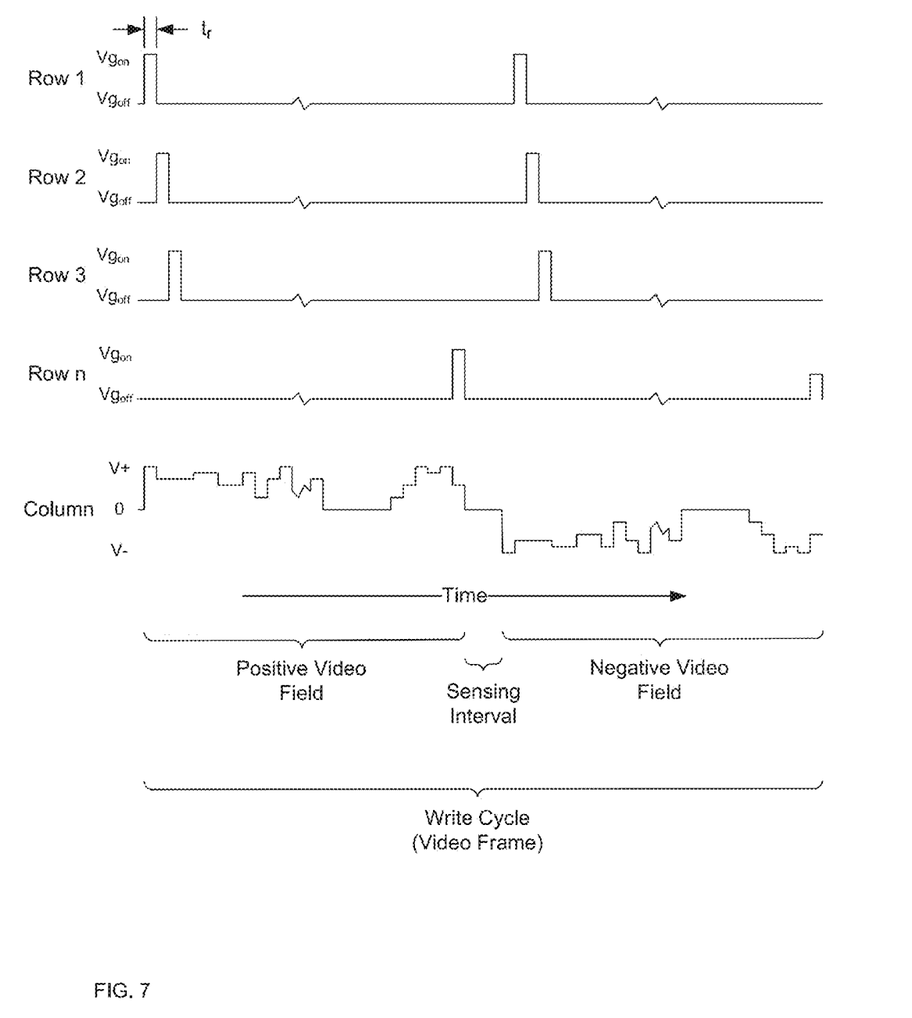
FIG. 7 is a timing diagram.

FIG. 7 is a timing diagram showing exemplary signals for forming an image on a liquid crystal display panel. Similar signals may be used to form an image on other active matrix display panels. The timing diagram may be understood with reference to the liquid crystal display device shown in FIG. 1. An image may be formed on the liquid crystal display panel 110 by cyclically writing image data to each of the pixels. Each write cycle, or video frame, may be divided into a position video field and a negative video field. During each video field, the row driver 160 may provide a voltage pulse to each of the row electrodes, such as row electrode 162, in sequence. Each row electrode, such as row electrode 162, may be connected to the gates of the transistors, such as the transistor 122, within the corresponding row of pixels. The row driver 160 may hold each row electrode at a voltage of $Vg_{off}$ and then, in sequence, switch each row electrode to a voltage $Vg_{on}$ for a period $t_r$. The period $t_r$ may be between 10 microseconds and 30 microseconds, depending on the number of rows in the display panel and the number of times the display panel is written each second. The voltage $Vg_{off}$ may be selected to bias all of the transistors in the corresponding row of the liquid crystal display panel to an off, or nonconductive, state. The voltage $Vg_{on}$ may be selected to bias the transistors in the corresponding row to an on, or conductive, state. Exemplary row signals are shown in the upper four waveforms in FIG. 7.

As the transistors in each row of picture elements are turned on in sequence by the row drivers, the column driver 150 may drive the plurality of column electrodes with analog video signals. The analog video may be essentially stored in the pixels as each row of transistors is turned on. At the same time, an AC signal coupled from a probe to one or more pixel electrodes in the "on" row may be coupled through the transistors to the column electrodes. The voltage coupled from the probe through the transistors may be sensed by the column sensor circuits. Thus a probe coupled to a localized group of pixel electrodes may be sensed by sensor circuits connected to the corresponding column electrodes during the period when the pixel transistors are turned on by the corresponding column electrodes. The location of the probe may be determined as the centroid of a group of column electrodes and a group of row electrodes, respectively.

Since coupling from a probe to each pixel electrode is determined individually through the associated column electrode when the associate row electrode is "on", the position of multiple probes proximate to the liquid crystal panel may be determined without ambiguity.

In the case where a probe is capacitively coupled to the row and column electrodes of a liquid crystal display panel, an AC voltage coupled from the probe may be sensed at any time during the display write cycle. However, it may be difficult to distinguish an AC signal coupled from the probe in the presence of thousands or row and column signals that may be switching during the display write cycle. To facilitate sensing a signal coupled from the probe, a brief sensing interval, during which none of the row or column electrodes is driven, may be provided in some or all of the display write cycles. A sensing interval may be provided, for example, at the end of each video field, or once per video write cycle, or at some other interval. During the sensing interval, the outputs of the row and column drivers may be held in a high impedance state to maximize the level of the coupled signal to be sensed.

Since AC signals coupled from one or more probes to the row and column electrodes may be sensed simultaneously during the sensing interval, the presence of two or more probes coupled to the liquid crystal panel may result in ambiguous determination of the position of each probe. For example, the presence of two probes coupled to a liquid crystal panel will result in coupled AC signals being sensed in two groups of column electrodes and two groups of row electrodes. However, each group of row electrodes will intersect with both groups of column electrodes such that there are four intersections. Two of the intersections may be the actual positions of the probe and the other two intersections are alias positions. The actual and alias positions may be discriminated by other means, such as the temporal sequence in which the AC signals were first detected, or by geographic sequence of the movement of the probes.

Figure 8:
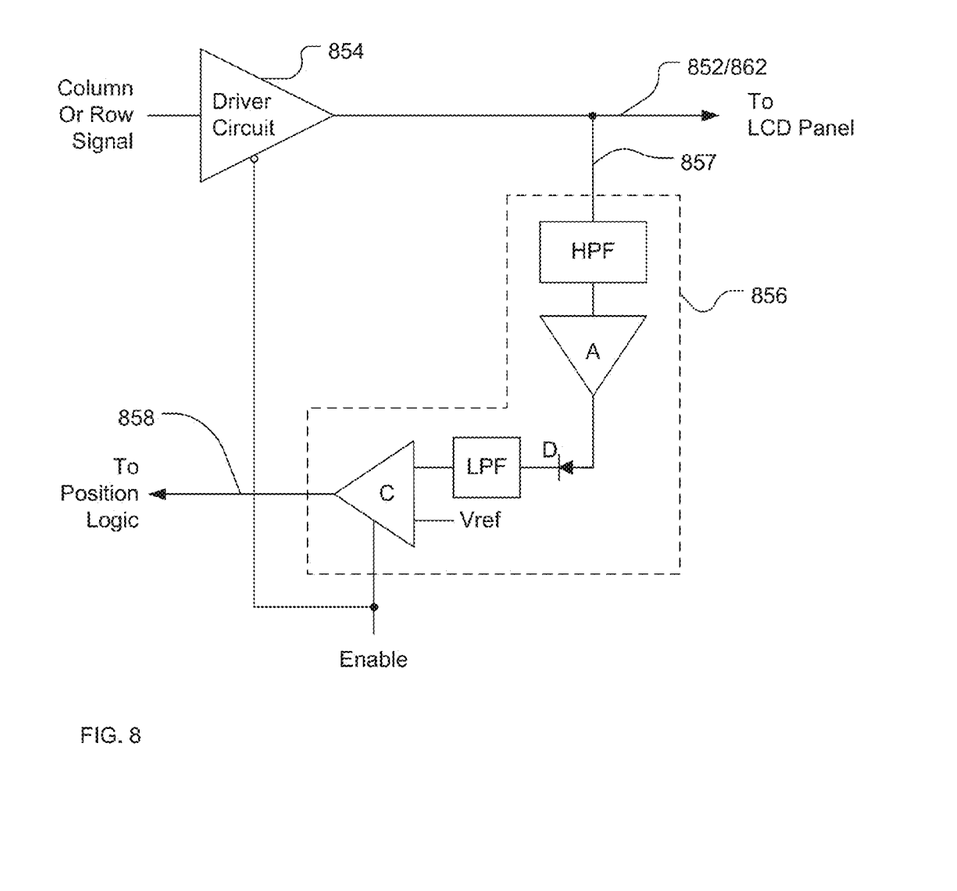
FIG. 8 is a block diagram of a sensor circuit.

FIG. 8 shows a block diagram of an exemplary sensor circuit 856 that may be suitable for use as a row sensor circuit or a column sensor circuit. The sensor circuit 856 may be suitable to sense an AC voltage capacitively coupled from a probe to either a row electrode or a column electrode within a display panel. The sensor circuit 856 may have an input 857 coupled to a row or column electrode 852/862. The row or column electrode 852/862 may be driven by a driver circuit 854, which may be a portion of a row driver or column driver.

The sensor circuit 856 may include a high-pass filter HPF to distinguish between the coupled AC signal and the row or column signal imposed on the row or column electrode 852/862 by the driver circuit 854. The sensor circuit 856 may incorporate a band-pass filter (not shown) in lieu or, or in addition to, the high-pass filter HPF. The filtered AC signal may be amplified by an amplifier A. The amplified AC signal may be converted to a DC level by a detector, exemplified by a diode D, and a low-pass filter LPF. The DC level may be compared to a reference level Vref by a comparator C to determine if a probe is proximate to the row or column electrode 852/862. The reference level Vref may be a static DC voltage, or may be an adaptive or adjustable voltage level set in accordance with user preferences. The output 858 of the sensing circuit 856 may be coupled to position logic (not shown).

An Enable signal may be provided to the comparator C and/or the driver circuit 854. The Enable signal may be adapted to enable the comparator C during a sensing interval within at least some display write cycles. The Enable signal may be adapted to place the output of the drive circuit 854 into a high impedance state during the sensing interval.

Figure 9:
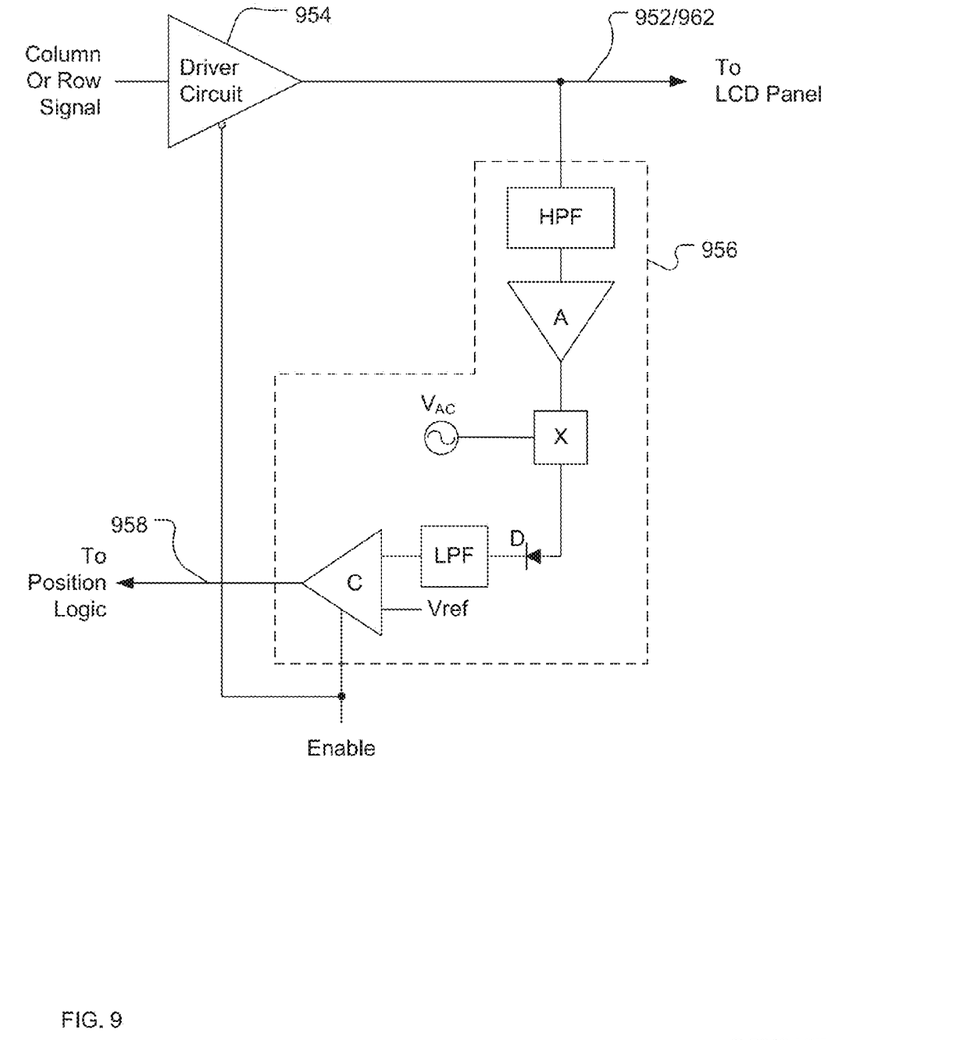
FIG. 9 is a block diagram of a sensor circuit.

FIG. 9 shows a block diagram of another sensor circuit 956 that may be suitable for use as a row sensor circuit or a column sensor circuit coupled to row or column electrode 952/962 of a display panel (not shown). The sensor circuit 956 may include a high pass filter HPF, an amplifier A, a low pass filter LPF, a detector exemplified by a diode D, and a comparator C that function similarly to the corresponding elements of the sensor circuit 856 of FIG. 8. In the sensor circuit 956, the voltage output from the amplifier A may be mixed with an AC reference voltage $V_{AC}$ by a mixer X. The AC reference voltage $V_{AC}$ may have a frequency close to, but not the same, as an AC signal coupled from a probe to the display panel. The output of the mixer X may include a low frequency signal having an amplitude proportional to the AC signal coupled from the probe and a frequency equal to the difference between the frequency of the AC signal coupled from the probe and the frequency of the AC reference signal $V_{AC}$. The low pass filter LPF may reject any signal component having a frequency higher than the difference frequency. Thus the sensor circuit 956 may be highly selective for the frequency of the AC signal coupled form the probe. The output 958 of the sensing circuit 956 may be coupled to position logic (not shown).

Figure 10:
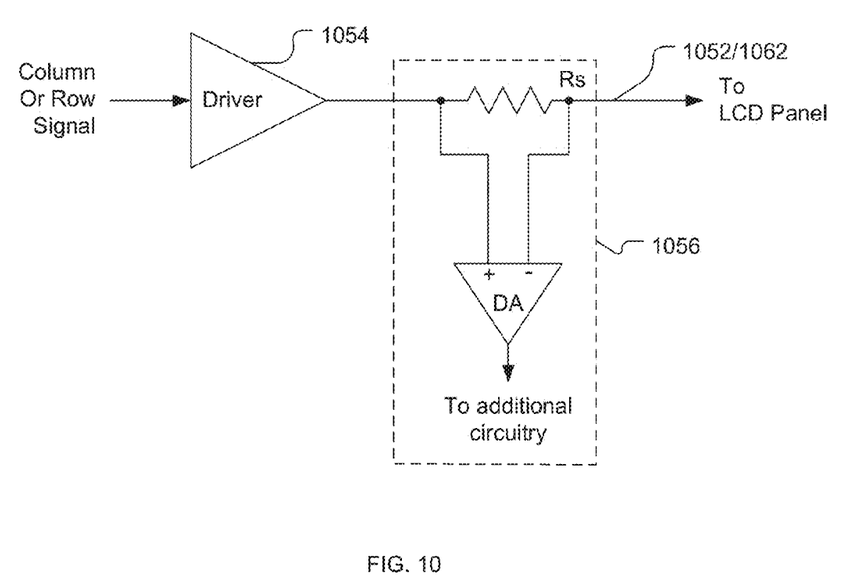
FIG. 10 is a block diagram of a sensor circuit.

FIG. 10 is a partial block diagram of another sensor circuit 1056 that may be suitable for use as a row sensor circuit 666 or a column sensor circuit 656 coupled to row or column electrode 1052/1062 of a display panel (not shown). A resistor Rs may be coupled between the output of a driver circuit 1054 and the associated row or column electrode 1052/1062. A differential amplifier DA may amplify the voltage developed across the resistor Rs due to current flowing from the driver circuit 1054 to the row or column electrode 1052/1062. The current flowing in resistor Rs may be due, in part, to capacitive coupling between the row or column electrode 1052/1062 and a probe proximate to the display panel. A high-pass or band-pass filter (not shown) may be coupled between the resistor Rs and the inputs to the differential amplifier DA. The output of the differential amplifier DA may be coupled to additional circuitry as shown in FIG. 8 and FIG. 9.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A display device with an integral touch screen, comprising:
    a display panel comprising a plurality of pixels, a plurality of column electrodes, and a plurality of row electrodes, each pixel controlled by a corresponding one of the plurality of column electrodes and a corresponding one of the plurality of row electrodes,
    wherein all of the column electrodes are coupled to respective column driver circuits and at least some of the column electrodes are coupled to respective column sensing circuits, each column sensing circuit adapted to sense capacitive coupling between the respective column electrode and a probe adjacent to an external surface of the display panel, and
    wherein all of the row electrodes are coupled to respective row driver circuits and at least some of the row electrodes are coupled to respective row sensing circuits, each row sensing circuit adapted to sense capacitive coupling between the respective row electrode and a probe adjacent to an external surface of the display panel.

2. The display device of claim 1, wherein the column sensing circuits and the row sensing circuits sense the capacitive coupling to the probe by detecting one of a current flow in the respective column and row electrodes and a voltage coupled to the respective column and row electrodes.

3. The display device of claim 2, wherein
the probe is grounded, and
the column sensing circuits and the row sensing circuits sense the capacitive coupling to the probe by detecting a current flow in the respective column and row electrodes.

4. The display device of claim 2, wherein
the probe is connected to an AC voltage source, and
the column sensing circuits and the row sensing circuits sense the capacitive coupling to the probe by detecting a coupled AC voltage in the respective column and row electrodes.

5. The display device of claim 4, wherein
the AC voltage source has predetermined frequency, and
the column sensing circuits and the row sensing circuits include filters selective for the predetermined frequency.

6. The display device of claim 4, wherein
the row driver and the column driver cyclically write image data to the display panel, and
the column sensing circuits and the row sensing circuits detect a coupled AC voltage during a sensing interval within at least some of the writing cycles.

7. The display device of claim 6, wherein
the row driver circuits and the column driver circuits are in a high impedance state during each sensing interval.

8. The display device of claim 1, wherein
the display panel is a liquid crystal display panel using in-plane switching.

9. The display device of claim 1, wherein
the display panel is a light emitting diode display panel.

10. A method of operating a display panel having a plurality of pixels, a plurality of column electrodes, and a plurality of row electrodes, each pixel controlled by a corresponding one of the plurality of column electrodes and a corresponding one of the plurality of row electrodes, the method comprising:
   forming an image on the display panel by applying respective drive signals to the plurality of column electrodes and the plurality of row electrode; and
   determining a location of a probe adjacent to an external surface of the display panel by sensing capacitive coupling between the probe and one or more of the column electrodes and one or more of the row electrodes.

11. The method of claim 10, wherein sensing capacitive coupling between the probe and one or more of the column electrodes and one or more of the row electrodes comprises:
   detecting a current flow in the one or more of the column electrodes and the one or more of the row electrodes.

12. The method of claim 11, wherein
the probe is grounded.

13. The method of claim 10, wherein sensing capacitive coupling between the probe and one or more of the column electrodes and one or more of the row electrodes comprises:
   detecting a voltage coupled from the probe to the one or more of the column electrodes and the one or more of the row electrodes.

14. The method of claim 13, wherein
the probe is connect to an AC voltage source.

15. The method of claim 14, wherein
the AC voltage source has predetermined frequency, and
detecting a voltage coupled from the probe to one or more of the column electrodes and one or more of the row electrodes includes filtering the voltages on the at least some of the column electrodes and at least some of the row electrodes using respective filters selective for the predetermined frequency.

16. The method of claim 13, wherein
forming an image on the display panel by applying respective drive signals to the plurality of column electrodes and the plurality of row electrode is performed cyclically, and
detecting a voltage coupled from the probe to the one or more of the column electrodes and one or more of the row electrodes is performed during a sensing interval within at least some of the image forming cycles.

17. The method of claim 10, wherein
the display panel is a liquid crystal display panel using in-plane switching.

18. The method of claim 10, wherein
the display panel is a light emitting diode display panel.

* * * * *